Aug. 10, 1926.  
C. N. F. KNAPÉ  
1,595,790  
RESILIENT DRIVING CONNECTION  
Filed August 22, 1922

WITNESSES:  
CNCochran  
WBJaspert.

INVENTOR  
Charles N. F. Knapé.  
BY  
Wesley G. Carr  
ATTORNEY

Patented Aug. 10, 1926.

1,595,790

UNITED STATES PATENT OFFICE.

CHARLES N. F. KNAPÉ, OF WILKINSBURG, PENNSYLVANIA, ASSIGNOR TO WESTINGHOUSE ELECTRIC & MANUFACTURING COMPANY, A CORPORATION OF PENNSYLVANIA.

RESILIENT DRIVING CONNECTION.

Application filed August 22, 1922. Serial No. 583,664.

My invention relates to resilient driving connections and particularly to those of a type employed in electric locomotives.

My invention is particularly designed for employment in connection with locomotive drives of the quill type wherein the quill arms carry springs that serve as yielding elements to effect resiliency between the driving motors and the traction wheels.

Heretofore, the wearing surfaces of the spring-supporting members have been formed integrally with portions of the said members, thus necessitating the scrapping of a large portion of the spring supporting structure when the said wearing surfaces have become worn.

My invention has for its object the provision of an improved form of spring-supporting device wherein the spring seats, or that portion of the spring-supporting structure that engages the traction wheel, may be readily replaced and which constitutes but a small portion of the said structure, thus avoiding the necessity of replacing certain parts of the structure that have heretofore been discarded after the drive had been in service for a comparatively short time.

As shown in the accompanying drawing:—

Figure 1:
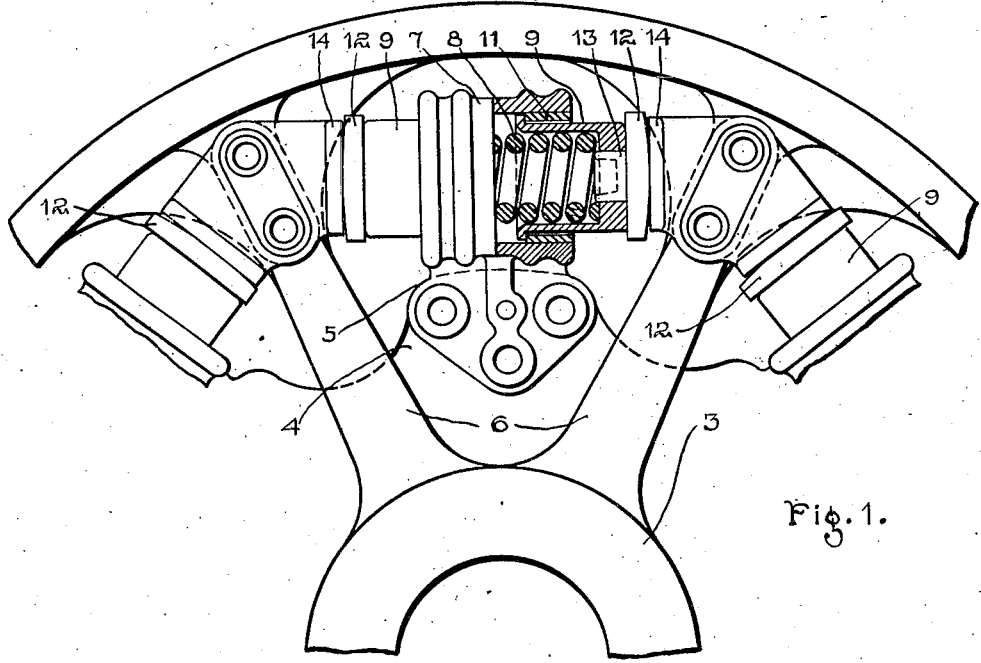
Figure 2:
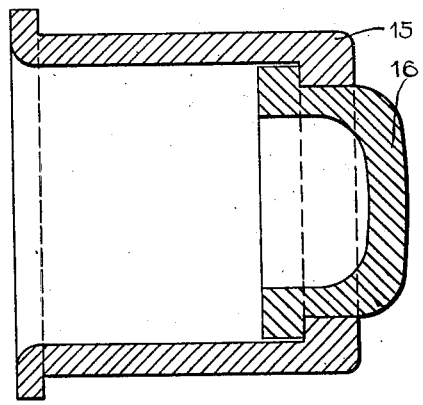

Figure 1 is a fragmentary view, partially in section and partially in side elevation, of a portion of a quill drive embodying my invention, and Fig. 2 is a sectional view of a portion of the mechanism of Fig. 1, in modified form.

One of the driving wheels 3 of a locomotive is mounted upon an axle (not shown) upon the other end of which a companion wheel, also not shown, is mounted. A quill 4 of the usual type, surrounds the axle and is provided with a series of arms 5 that extend radially and axially to points between spokes 6 of the locomotive-driving or traction wheels.

Each of the quill arms 5 terminates in a cylindrical portion 7 within which a compression spring 8 is disposed. The spring 8 is retained in place by a pair of cups 9 that are slidably supported within the cylindrical member 7 and are held against displacement by rings 11 that have press-fit engagement with the cylindrical member 7.

Heretofore, it has been customary to make each spring-holding cup of one piece and have the exterior of the bottom portion thereof engage driving wheels. When the bottom of a cup became worn, it was necessary to disassemble the supporting members for the spring and to discard the entire cup. By my construction, I perforate the bottom of the cup 9 and provide a wearing block 12 that is provided with an extension 13 which has press fit engagement with the wall of the said perforation.

The wearing block 12 abuts against a block 14 that is secured to the spoke 6. When the block 12 has become worn to such degree that replacement is required, such block may be readily replaced by withdrawing it from the cup 9 and inserting a new block. This replacement may be effected without removing the quill arm, by compressing the cup 9 against the spring 8.

In the form shown in Fig. 2, the cup 15 is provided with a removable bottom 16 that engages the driving wheels in substantially the same manner as do the blocks 12. The bottom member 16 may be replaced, without removing the quill arm 5 from the locomotive, by withdrawing the cup and the ring 11 from the cylindrical portion of the quill arm.

From the foregoing, it will be clear that I provide a driving mechanism that is simple and effective and not subjected to losses by wear, such as are incurred in drives of the types heretofore employed.

Various modifications and changes may be made without departing from the spirit and scope of the invention, as defined by the accompanying claims.

I claim as my invention:—

1. The combination with a driving member and a driven member, of a resilient connection therebetween comprising a yielding member and a supporting member therefor provided with a removable wearing plate, the said wearing plate having abutting engagement with the other of the said members.

2. The combination in a quill drive for locomotives, of a yielding element carried by the said quill, an enclosing member for the yielding element which is movable with respect to the said quill, and a wearing plate detachably secured to the said enclosing member.

3. The combination with a driving member and a driven member, of a resilient driving connection comprising a sleeve member secured to said driving member, a yielding member disposed therein and a retainer for said yielding member, comprising a substantially cup shape member having a perforate bottom and a renewable seating portion disposed therein.

4. The combination with a driving member and a driven member, of a resilient driving connection comprising a sleeve member secured to said driving member, a yielding member disposed therein and a retainer for said yielding member, comprising a substantially cup shape member having a perforate bottom and a renewable seating portion disposed therein, said seating portion being adapted to engage the driven member.

5. The combination with a driving member and a driven member, of a resilient driving connection comprising a sleeve member secured to said driving member, a yielding member disposed therein and a plurality of retainers for said yielding member, comprising a substantially cup shape member having a perforate bottom and a renewable seating portion disposed therein.

6. The combination with a driving member and a driven member, of a resilient driving connection comprising a sleeve member secured to said driving member, a yielding member disposed therein and a plurality of seating portions for said yielding member having a renewable base.

In testimony whereof, I have hereunto subscribed my name this 5th day of August 1922.

CHARLES N. F. KNAPÉ.